(12) United States Patent
Schilb et al.

(10) Patent No.: US 6,360,904 B1
(45) Date of Patent: Mar. 26, 2002

(54) ADJUSTABLE SHELVING FOR ROBOTIC WORK STATION

(75) Inventors: Christopher J. Schilb, Bettendorf; Bradley D. Niles, Camanche, both of IA (US)

(73) Assignee: Genesis Systems Group, Ltd., Davenport, IA (US)

( * ) Notice: Subject to any disclaimer, the term of this patent is extended or adjusted under 35 U.S.C. 154(b) by 0 days.

(21) Appl. No.: 09/717,762

(22) Filed: Nov. 21, 2000

(51) Int. Cl.[7] ............................................. A47B 43/00
(52) U.S. Cl. ..................................................... 211/187
(58) Field of Search ................................. 211/187, 150, 211/149, 119.003, 90.01

(56) References Cited

U.S. PATENT DOCUMENTS 4,292,902 A * 10/1981 Barrineau ................... 108/146
4,586,759 A    5/1986 Wrobel
4,708,554 A   11/1987 Howard
6,220,464 B1 *  4/2001 Battaglia et al. ............ 211/187

* cited by examiner

Primary Examiner—Alvin Chin-Shue
Assistant Examiner—Sarah Purol
(74) Attorney, Agent, or Firm—Zarley, McKee, Thomte, Voorhees & Sease P.L.C.

(57) ABSTRACT

An adjustable shelving unit for a robotic work station includes a plurality of elongated upright channel members each having a C-shaped transverse cross-section, the channel members being arranged in parallel pairs; and at least one shelf being releasably and movably clamped to the channel members by spring nut means so as to be adjustable in both height and angle with respect to the channel members. The adjustable shelving unit is useful in combination with a work piece positioning device and can even be attached thereto so that bins for parts and parts can be stored near their point-of-use.

14 Claims, 5 Drawing Sheets

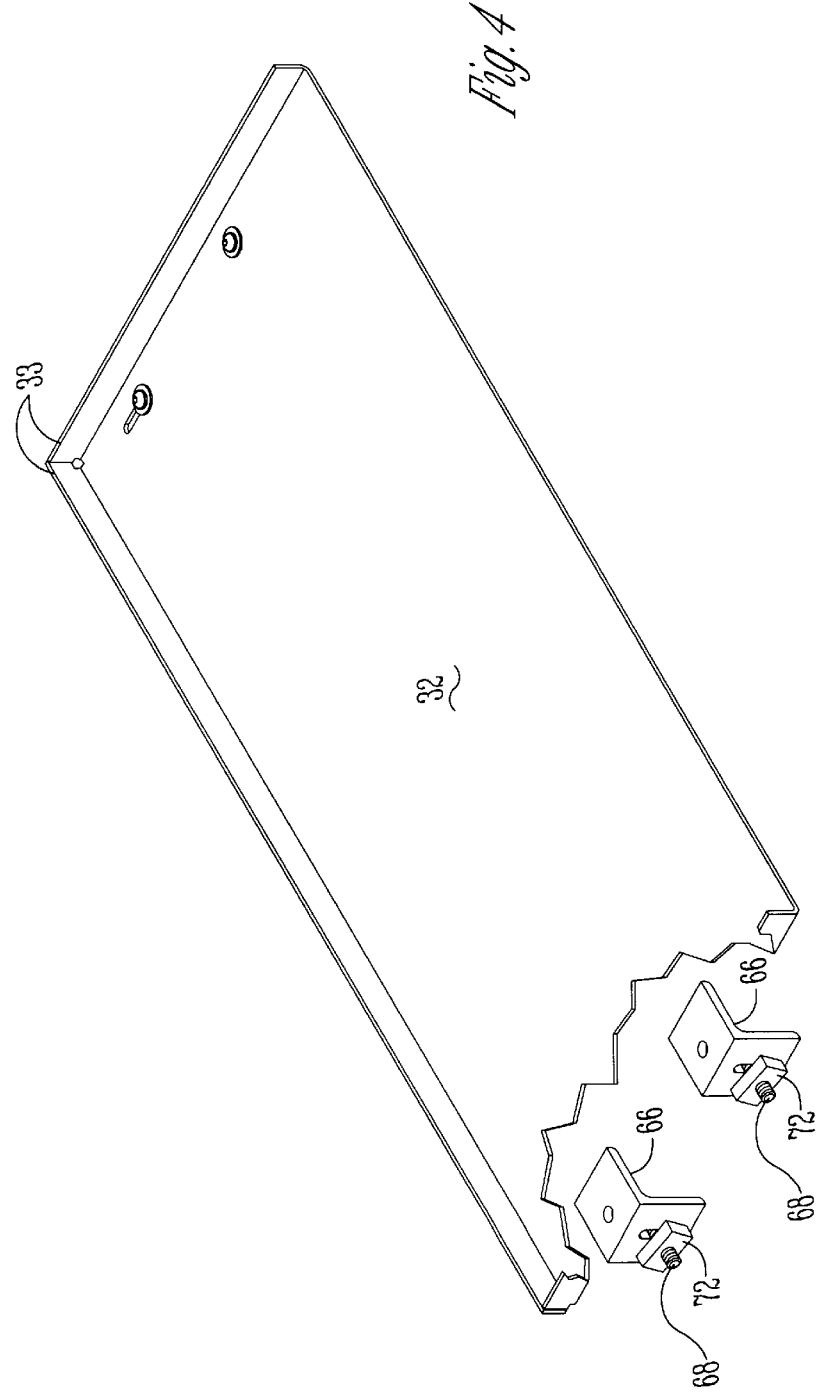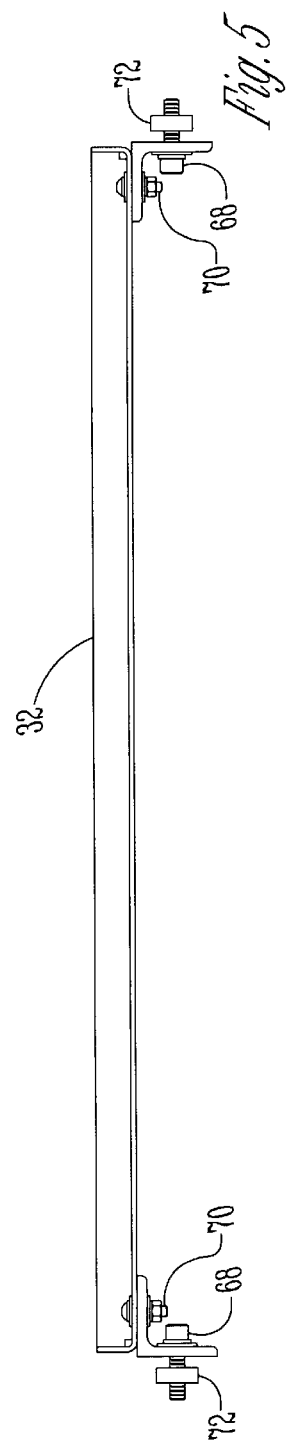

ADJUSTABLE SHELVING FOR ROBOTIC WORK STATION

BACKGROUND OF THE INVENTION

The present invention relates to adjustable shelving for storing or staging work pieces in close proximity to a robotic work station.

Robotic work stations are becoming more commonplace in industry. For example, a conventional work piece positioning device for a robotic welding operation includes a rotatable fixture having two part-holding drums on opposite sides thereof. The first drum is initially on the operator's side of the device, which allows the operator to remove the welded work pieces and load onto the drum the work pieces to be welded. Meanwhile, on the robot's side of the device, the robot welds the previously loaded work pieces found on the second drum. When the robot completes its welding operations on the parts on the second drum, the positioning device rotates the fixture so that the first drum is presented to the robot and the second drum is presented to the operator for unloading and loading.

It is desirable to have parts bins near the machine for the operator's use. Thus, conventional stand alone shelving units having fixed shelves traditionally have been provided in the general vicinity of the operator's side of the positioning device. However, there is a need for shelving units on or near work piece positioning devices for robotic work stations wherein both the height and angle of the shelves can be adjusted easily to accommodate bins for parts and parts of various sizes, shapes and orientations.

Thus, a primary objective of the present invention is the provision of an improved shelving unit to be placed on or near a work piece positioning device in a robot work station.

Another objective of the present invention is the provision of a shelving unit wherein both the height and angle of at least one of the shelves is easily adjustable.

Another objective of the present invention is the provision of a shelving unit that is integrally attached to the work piece positioning device.

Another objective of the present invention is the provision of an adjustable shelving unit that is inexpensive to manufacture, adaptable to holding bins for parts and parts of various sizes and shapes, and durable and reliable in use.

These and other objectives will be apparent from the drawings, the claims and the description and that follows.

SUMMARY OF THE INVENTION

The invention relates to adjustable shelving for storing or staging bins for parts and parts in close proximity to a robotic work station. The shelving unit of this invention includes one or more shelves movably and releasably clamped to channel members on a shelf frame with mounting means that permit both the height and angle of the shelves to be adjusted. The shelving unit can stand alone or can be integrally attached to the headstock or tailstock of a work piece positioning device, an existing fence, or other stationary equipment in the robotic work station.

BRIEF DESCRIPTION OF THE DRAWINGS

FIG. 4 is a top plan view of one of the shelves of this invention. One end of the shelf has been broken away to expose the portions of the mounting means attached thereto.

FIG. 5 is an elevation taken from the rear of the shelf of FIG. 4.

DETAILED DESCRIPTION OF THE PREFERRED EMBODIMENT(S)

Figure 1:
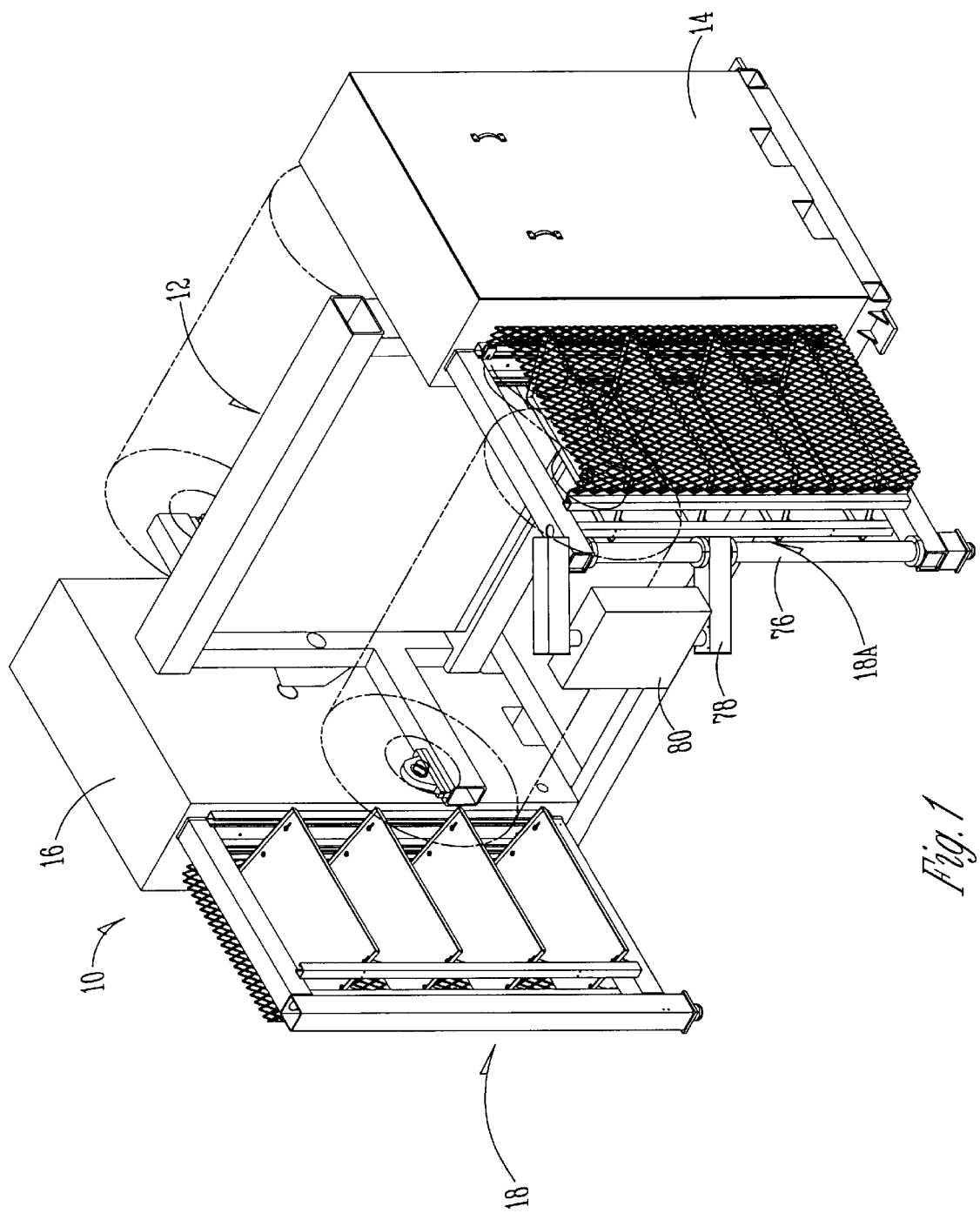
FIG. 1 is a perspective view of the shelving unit of the present invention integrally attached to an end of a work piece positioning device.
Figure 2:
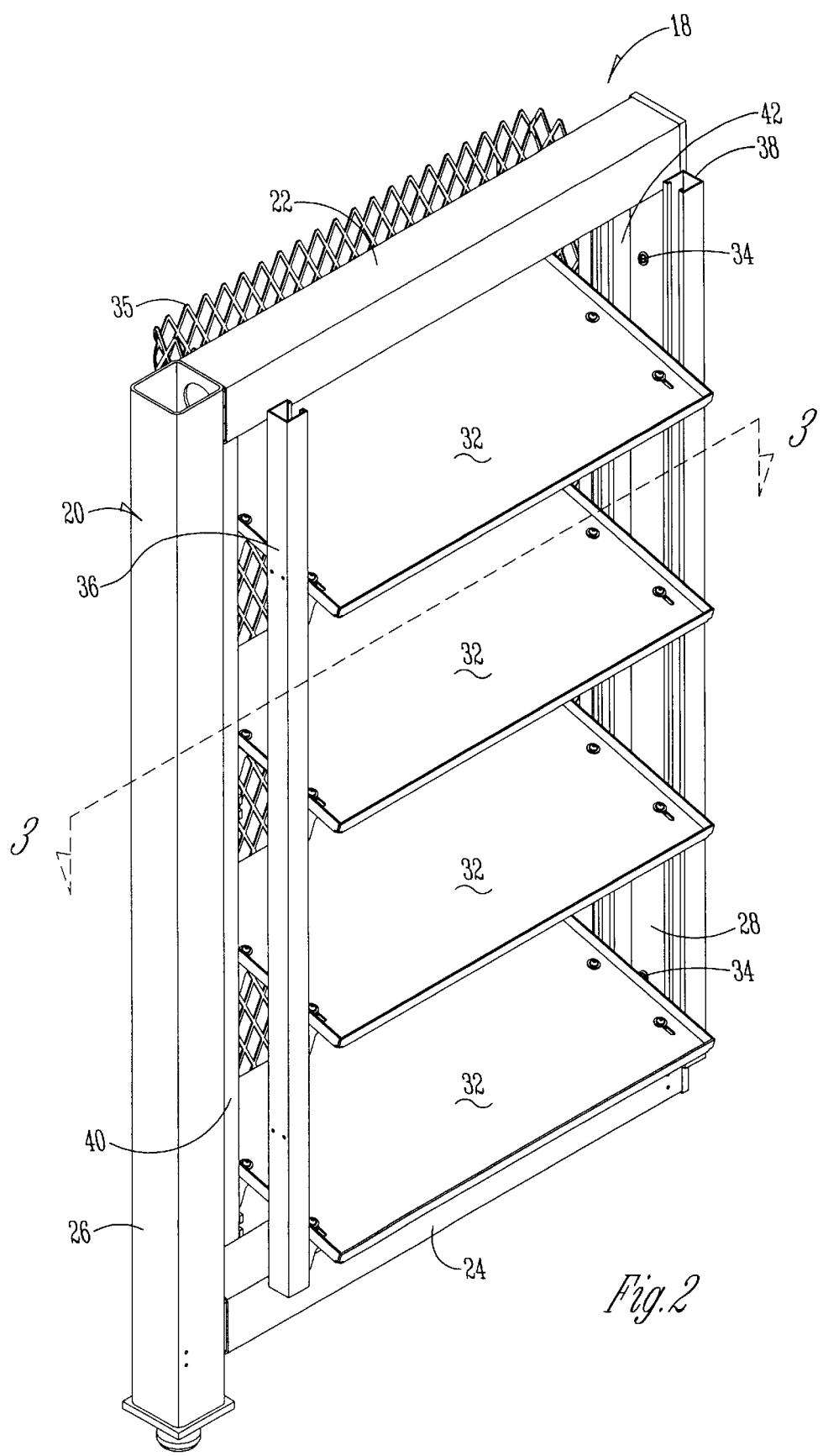
FIG. 2 is a perspective view of one embodiment of the adjustable shelving unit of this invention.
Figure 3:
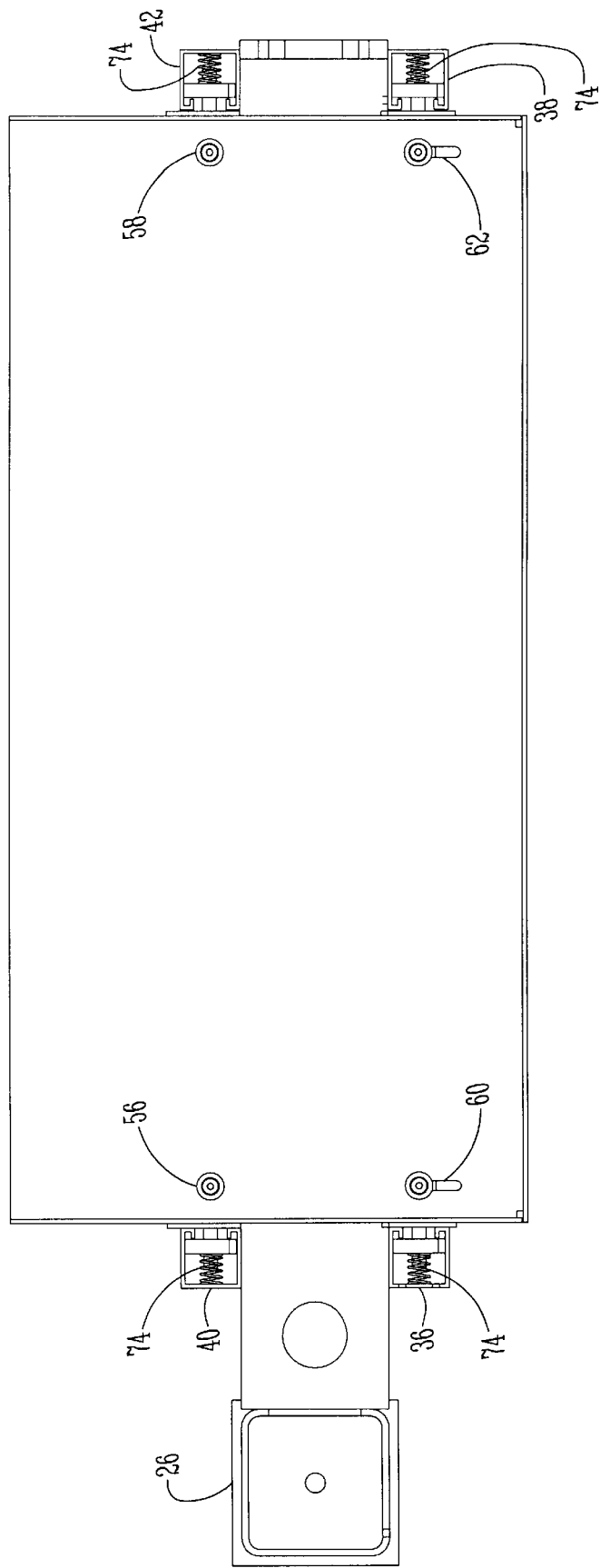
FIG. 3 is a cross-sectional view of the shelving unit taken along line 3—3 in FIG. 2.

A work piece positioning device 10 for robotic welding is shown in FIG. 1. The device 10 includes a fixture 12 rotatably mounted between a headstock 14 and a tailstock 16. As indicated by phantom lines with two short dashes located between longer dashes, a rotary powered drum is conventionally mounted on either side of the fixture 12. In the example shown in FIG. 1, the operator stands in front of the fixture 12 and loads parts on the drum, while the robot for welding or performing other operations on the parts resides behind the fixture 12.

Figure 6:
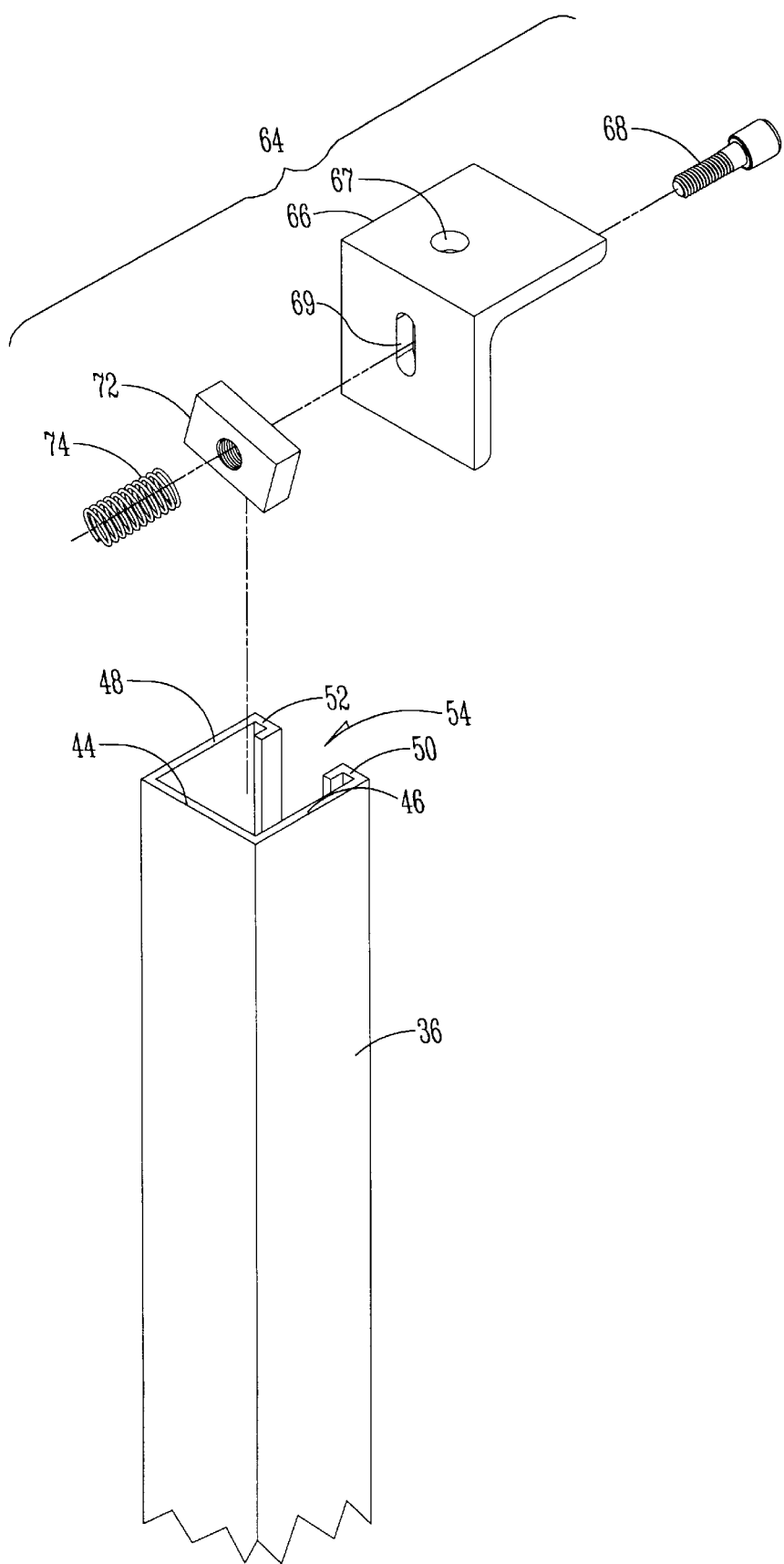
FIG. 6 is an exploded assembly view of the channel member and adjustable shelf mounting means.

In one embodiment, the adjustable shelving unit 18 of this invention has a frame 20 that includes a top rail 22, a bottom rail 24 and opposite side rails 26, 28. The rails 22, 24, 26, 28 collectively define an aperture 30 therebetween for receiving one or more adjustable position shelves 32. As best seen in FIGS. 1 and 6, the shelf 32 is formed such that a raised lip 33 extends around at least a portion of the perimeter of the shelf 32 to help retain items on the shelf. Preferably the lip 33 extends around the sides and front of the shelf 32. The rails 22, 24, 26, 28 are constructed of a strong, rigid and durable material, such as lightweight tubular steel or aluminum. To place the bins for parts or parts on the shelf in close proximity to their point of use, the side rail 28 secures through welding or with other conventional fasteners 34 to the front side of the tailstock 16. Thus, the shelving unit 18 is integrally attached to the workpiece positioning device at the tailstock 16.

Elongated first and second C-shaped channel members 36, 38 are rigidly attached by welding or other suitable means to the front of the frame 20 as shown. The first channel member 36 attaches to the side rail 28 and extends longitudinally alongside it. The second channel member 38 resides on the other side of the aperture 30 and is spaced laterally from, preferably parallel to, the first channel member 36. Third and fourth elongated C-shaped channel members 40, 42 are similarly attached rigidly to the rear of the frame 20 on either side of the aperture 30. An optional expanded steel mesh protective guard 35 mounts to the frame 20 at the third and fourth C-shaped members 40,42 as shown. The guard 35 prevents personnel from reaching through the shelving unit and prevents bins for parts or parts from being pushed off the back of the shelves 32.

As best seen in FIGS. 7, shows that a typical channel member 38 has a rear wall 44, opposite side walls 46,48 and front walls 50, 52 attached to the side walls respectively. The front walls 50, 52 extend inwardly toward each other, leaving longitudinal slot or gap 54 therebetween that defines the entrance or throat of the channel member. The gaps 54 in the channel members 36, 38, 40, 42 are directed toward the middle of the aperture 30.

As best seen in FIGS. 3–6, the shelf 32 has opposite first and second side edges that are adjacent the pairs of C-shaped members 36, 38 and 40, 42, respectively. Holes 56, 58 and slots 60, 62 extend through the shelf 32 as shown. Using the holes 56, 58 and the slots 60, 62, mounting means are attached to the shelf 32 adjacent the first and second side edges. A portion of the mounting means inserts into the C-shaped channel members 36, 38, 40, 42 so as to slidingly, pivotally and releaseably fix the shelf in a given position relative to the C-shaped members. The mounting means includes a spring nut 64 slidably installed into the C-shaped channel member, a generally L-shaped bracket 66, and a threaded fastener or bolt 68 connecting the shelf 32 to the spring nut 64 through the L-shaped bracket. A second threaded fastener means 70 attaches the L-shaped bracket 66 to the shelf 32. As best seen in FIGS. 4 and 6, the bracket 68 has a hole 67 through one of its legs and an elongated slot 69 through the other leg.

The C-shaped channel members 36, 38, 40, 42 are available from the Uni-Strut Corporation. The spring nut 64 of this invention includes an oblong, preferably substantially rectangular, nut 72 and a spring 74. The nut 72 has a longitudinal dimension that is greater than the width of the gap 54 in the C-shaped channel member. However, the transverse dimension of the nut 72 is less than the width of the gap 54. Therefore, when the nut 72 is properly oriented, the spring nut 64 can be installed into or removed from the strut or channel member 36, 38, 40, 42. In the course of normal operation, use and adjustment, the longitudinal axis of the nut 72 extends transversely across the gap 54 and the spring 74 yieldingly biases the nut 72 into frictional engagement with the front walls 50,52.

To adjust the position of the shelf 32, the user merely loosens all four of the bolts 68 of the spring nut 64 and the front two fastener means 70. Then the shelf 32 can be moved to the desired height and angle of inclination. The slots 60 and 69 permit the angle of the shelf to be varied. When the bolts 68 are loosened approximately one to two turns, the springs 74 urge the nuts 72 into frictional engagement with their respective channel members 36, 38, 40, 42 to provide a light drag or resistance against movement. Finally, the user tightens the bolts 68 and the fastener means 70 to releasably lock or clamp the shelf in its new position.

Therefore, it can be seen that the present invention at least satisfies its stated objectives. The invention provides an improved shelving unit that offers adjustment of both the height and angle of the individual shelves. Furthermore, the shelving unit integrally attaches to the workpiece positioning device.

It is contemplated that a single pair of channel members 36, 38 will be sufficient in some cases to support and position a relatively shallow depth or light duty shelf 32.

Another embodiment of the present invention is designated in FIG. 1 by the reference numeral 18A. First, the shelving unit 18A differs from the shelving unit 18 in that it is attached to the headstock 14 of the positioning device 10. Furthermore, the square tubing of the side rail 26 has been replaced by a round tube 76 that has a swivel stand 78 pivotally mounted thereon in a conventional manner. An operator console 80 pivotally mounts on the stand 78.

The preferred embodiments of the present invention have been set forth in the drawings and specification, and although specific terms are employed, these are used in a generic or descriptive sense only and are not used for purposes of limitations. Changes in the form and proportion of parts, as well as in the substitution of equivalents, are contemplated as circumstances may suggest or render expedient without departing from the spirit and scope of the invention as further defined in the following claims.

What is claimed is:

1. In combination, a work piece positioning device for a robot and an adjustable shelving unit comprising:

a shelf frame having an aperture therein for receiving at least one shelf;

an elongated first member attached to the shelf frame adjacent the aperture and including a longitudinal channel therein having a C-shaped transverse cross-section;

an elongated second member attached to the shelf frame adjacent the aperture, the second member being spaced from and parallel to the first member, the second member including a longitudinal channel therein having a C-shaped transverse cross-section;

a shelf positioned in the aperture between the first and second members and including opposite first and second side edges adjacent the first and second members respectively;

spring nut mounting means attached to the shelf adjacent the first and second side edges and inserted into spring biased frictional sliding engagement within the C-shaped channel of the first member and the C-shaped channel of the second member respectively so as to slidingly, pivotally, and releasably clamp the shelf in a given height and angular position relative to the first and second members;

whereby the height and angle of the shelf with respect to the first and second members are adjustable by unclamping the spring nut mounting means from the first and second channel members and moving the shelf from a first position to a second position, thence clamping the spring nut mounting means to the first and second channel members.

2. The combination of claim 1 wherein the spring nut mounting means includes a spring nut and a spring inserted into the C-shaped channel, and a L-shaped bracket attached to the shelf, the bracket being connected to the spring nut by a threaded fastener so as to releasably clamp a portion of the C-shaped channel between the bracket and the nut.

3. The combination of claim 2 wherein the L-shaped bracket has a first leg and a second leg, the first leg having a round hole therethrough for receiving a fastener to attach the first leg to the shelf, the second leg having an elongated slot therethrough for receiving the fastener connecting the bracket to the spring nut.

4. The combination of claim 3 comprising third and fourth members identical to the first and second members, the third and fourth members being spaced behind the first and second members and having mounting means independently associated therewith such that a rear portion of the shelf can be set to a height that is different than a front portion of the shelf.

5. The combination of claim 4 wherein the shelf has a pair of round holes through the rear portion of the shelf and a pair of elongated slots through the front portion of the shelf, said holes and slots each being adapted to receive the fastener for attaching the first leg of the bracket to the shelf.

6. The combination of claim 1 wherein the adjustable shelving unit comprises a plurality of adjustable shelves.

7. The combination of claim 1 wherein the shelf frame is attached to the workpiece positioning device.

8. The combination of claim 1 wherein the shelf frame is rigidly attached to the workpiece positioning device.

9. In combination, a work piece positioning device and an adjustable shelving unit comprising:

four elongated upright channel members each having a C-shaped transverse cross-section, the channel members being arranged in parallel pairs, at least one of the channel members being attached to the work piece positioning device;

at least one shelf being releasably and movably clamped to the four channel members by four spring nut means so as to be adjustable in both height and angle with respect to the channel members.

10. The combination of claim 9 wherein the work piece positioning device has a frame with a headstock and a tailstock thereon, the adjustable shelving unit being attached to the tailstock.

11. The combination of claim 9 wherein the work piece positioning device has a frame with a headstock and a tailstock thereon, the adjustable shelving unit being attached to the headstock.

12. The combination of claim 11 wherein the adjustable shelf further comprises a shelf frame including a pair of spaced opposite side rails connected by a top rail and a bottom rail, one of the side rails being attached to the headstock and the other of the side rails comprising a round tube on which a swivel stand is pivotally mounted.

13. The combination of claim 12 comprising an operator console pivotally mounted to the swivel stand.

14. An adjustable shelving unit comprising:

four elongated upright channel members each having a C-shaped transverse cross-section, the channel members being arranged in parallel pairs;

at least one shelf being releasably and movably clamped to the four channel members by four spring nut means so as to be adjustable in both height and angle with respect to the channel members.

* * * * *